United States Patent Office 3,345,381
Patented Oct. 3, 1967

3,345,381
CYCLIC SULFIDE PROCESS
Robert W. Campbell, Orinda, Calif., assignor to Chevron Research Company, San Francisco, Calif., a corporation of Delaware
No Drawing. Filed Aug. 17, 1965, Ser. No. 480,478
13 Claims. (Cl. 260—329)

ABSTRACT OF THE DISCLOSURE

Thiophane and thiophane-like cyclic sulfides are produced by the cobalt sulfide catalyzed reduction of cyclic carboxylic acid anhydrides using hydrogen sulfide.

---

This invention relates to a process for the partial reduction of cyclic organic acid anhydrides. More particularly it relates to the production of cyclic sulfides by a catalytic reduction of cyclic organic acid anhydrides in the presence of hydrogen sulfide and cobalt sulfide.

Cyclic sulfides, for example thiophane and the like, are useful as odorants in natural gas while the less volatile higher molecular weight sulfides are useful as oxidation inhibitors, in rubber chemistry, as modifiers of perfume fragrances and the like. They are also useful as solvents and chemical intermediates.

It has now been found that cyclic sulfides can be produced by reacting cyclic organic acid anhydrides with hydrogen sulfide in the presence of cobalt sulfide at a temperature in the range of about 180 to 325° C. The anhydride compounds useful in the process may be represented by the general formula

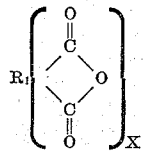

in which $R_1$ is a hydrocarbon radical having from 2 to about 18 carbon atoms and X is a whole number less than three. The resulting cyclic sulfides are also representable by a general formula,

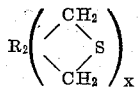

and in this case $R_2$ is a saturated hydrocarbon radical having from 2 to about 18 carbon atoms and X is one or two. The acid anhydrides contemplated contain the anhydride functionality in a 5- or 6-membered carbon-oxygen heterocyclic ring containing at least 4 but less than 6 carbon atoms.

The net chemical transformation occurring in the process may be represented by the representative equation:

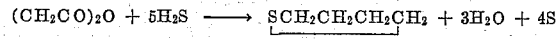

$(CH_2CO)_2O + 5H_2S \longrightarrow SCH_2CH_2CH_2CH_2 + 3H_2O + 4S$

Under the process conditions, sulfur reacts readily with hydrogen gas to form hydrogen sulfide. Hydrogen is therefore desirably added to the reaction system since the conversion of sulfur to hydrogen sulfide tends to drive the reaction more fully towards completion.

A further advantage found in the use of added hydrogen is that the substantial absence of elemental sulfur in the product mixture facilitates work-ups.

Hydrogen sulfide is, of course, a gas at the process temperatures. Maintenance of elevated pressures in the reaction system is therefore desirable. A super atmospheric system pressure, i.e. of at least 500 p.s.i., is desirable in terms of satisfactory reaction rate effects. The use of higher system pressures is more advantageous, up to, for example, 10,000 p.s.i. and higher, but, of course, high pressure equipment costs, as a practical matter, may dictate the use of intermediate pressure ranges.

Transition metal sulfides in general appear to have some catalytic activity for the present reduction reaction. Cobalt sulfide, however, seems to be substantially superior as a catalyst and is preferred. It may be added per se to the reaction zone or formed in situ. Cobalt compounds in general appear to interact with hydrogen sulfide under the process conditions and to form at least catalytic amounts of cobalt sulfide. Those cobalt compounds which are soluble in the acid anhydride feed are preferred because the freshly prepared cobalt sulfide formed in situ is very finely divided and particularly effective.

Effective and satisfactory amounts of cobalt catalyst relative to a mol of feed compound correspond in general to conventional requirements in catalytic reductions, i.e. from about 0.01 up to about 0.1 mol per mol of the anhydride to be reduced. Much larger relative amounts may, of course, be used as in a fixed or fluid bed type operation.

Representative acid anhydrides useful as feed compounds for the process ar succinic, o-phthalic, pyromellitic, cyclohexane-1,2-dicarboxylic, methylsuccinic, 4-t-butyl - o - phthalic, 4 - decylcyclohexane - 1,2 - dicarboxylic, toxilic, itaconic, phenylsuccinic, camphoric, naphthalic, citraconic, 4 - n - hexylnaphthalic, 3,4,5 - trimethyl-cyclohexane-1,2-dicarboxylic acid and the like acid anhydrides.

The following examples are intended for purposes of illustration only.

Example 1

A 4.5-liter shaker bomb was charged with 200 grams (2 mols) of succinic anhydride, 10 grams of cobalt chloride, and 545 grams (16 mols) of $H_2S$. After this, it was pressured to 950 pounds with hydrogen. The reaction mixture was agitated for 18 hours at 230–260° C. during which time the maximum pressure observed was 3400 p.s.i. After cooling down, the liquid contents were removed from the bomb and the small amount of aqueous material discarded.

The organic layer, after drying, was analyzed by vapor-phase chromatography using appropriate standards and found to contain 27% thiophane, 11% thiophane, and 5% γ-butyrothiolactone. These yields are mol percent based on the succinic anhydride starting material. When the intermediates, thiophene and γ-butyrothiolactone, are recycled to the process, the yield of saturated cyclic sulfide is correspondingly increased.

Example 2

A 4-liter autoclave was charged with 150 grams (1.32 mols) of methyl succinic anhydride, 5 grams of cobalt acetate, and 540 grams (15.9 mols) of $H_2S$. The bomb was then pressured to 950 p.s.i. with hydrogen and agitated for 2 hours at 260° C. The products were worked up as previously described. In this case, the yields were based upon nuclear magnetic resonance spectra. The product contained 20% 2-methyl thiophane and 29% methyl-γ-thiobutyrolactone.

Example 3

As in Example 2 except that no cobalt catalyst was added, the conversion of methyl succinic anhydride to methyl thiophane was attempted. None was detectable in the reaction mixture.

Example 4

The 4-liter shaker bomb was charged with 154 grams (1 mol) of 1,2,3,6-tetrahydrophthalic anhydride, 5 grams of cobalt chloride, and 340 grams (10 mols) of $H_2S$. The bomb was pressured to 1000 p.s.i. with hydrogen and heated at 280–300° C. for 18 hours. The work-up of the products gave 53% of 8-thiabicyclo[4.3.0]nonane (I) and a small amount of 8-thiabicyclo[4.3.0]nonadiene-6,9 (II).

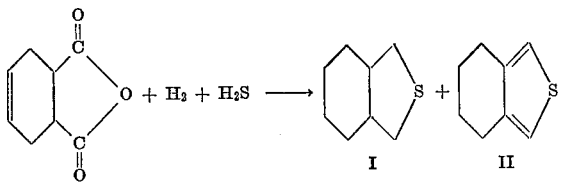

This latter compound (II) was identified by the NMR spectra obtained with tetramethyl silane as an internal standard which showed three peaks at 8 p.p.m. of 1.65 (multiplet), 2.65 (multiplet), and 6.6 (singlet). These peaks had areas in the ratio of 2:2:1 exactly as required for this compound.

*Analysis.*—Calculated for $H_{10}S$: C, 69.51; H, 7.29; S, 23.20. Found: C, 69.44; H, 7.22; S, 23.11. Infrared spectra showed adsorption at 840, 870, and 3130 cm.$^{-1}$.

Example 5

As in Example 4 except that the feed was hexahydrophthalic anhydride, an experiment was carried out and found to result in a 69% yield of 8-thiabicyclo[4.3.0] nonane (I) obtained as a mixture of the cis- and trans- isomers. These isomers were separated by the vapor-phase chromatograph and identified by comparing the I.R. spectras with those of the known isomers [J.O.C. 19, 1449 (1954)].

Example 6

In the same manner as in Example 1, a 2.5-liter shaker bomb was charged with 86 grams (1.0 mol) of γ-butyrolactone, 2 grams of cobalt chloride, 360 grams (10.5 mols) of $H_2S$ and then pressured to 850 p.s.i. with hydrogen. Reaction was carried out for 2 hours at 260° C., and then the product was worked up as in Example 1. In this case, conversion of lactone was in excess of 99%. The product contained 35% thiophane and 45% γ-butyrothiolactone.

This example demonstrates that lactones corresponding to partially hydrogenated acid anhydrides of the subject invention, i.e. of the general formula

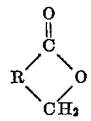

wherein R is a hydrocarbon radical having from 2 to 18 carbon atoms and in which the lactone ring is a 5- or 6-membered heterocyclic ring, are readily converted to the cyclic sulfides of the aforedescribed general formula.

Example 7

This run was carried out under the same conditions as Example 6 except that diethyl succinate was substituted for γ-butyrolactone. No detachable reaction occurred.

This example shows that the oxygen-carbon heterocyclic ring is required for a reduction to take place.

I claim:
1. Process for the production of cyclic sulfides of the formula

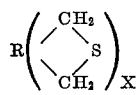

wherein R is a hydrocarbon radical having from 2 to about 18 carbon atoms, and X is a whole number less than three, which comprises reacting with hydrogen sulfide an acid anhydride of the formula

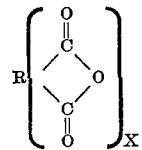

wherein R and X are as above and wherein said anhydride functionality is present in a carbon-monooxygen heterocyclic ring containing at least 4 but less than 6 carbon atoms, said reaction being carried out at a temperature in the range from about 180° C. to 325° C. in the presence of cobalt sulfide.

2. Process for the production of cyclic sulfides from acid anhydrides of the general formula

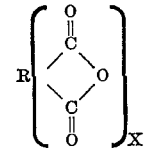

wherein R is a hydrocarbon radical having from 2 to about 18 carbon atoms, X is a whole number less than three, and wherein said anhydride functionality is present in a carbon-monooxygen heterocyclic ring containing at least 4 but less than 6 carbon atoms, which comprises reacting under superatmospheric pressure said anhydride with hydrogen sulfide at a temperature in the range from about 180° to 325° C. in the presence of cobalt sulfide and added hydrogen gas.

3. Process of claim 2 wherein said cobalt sulfide is produced in situ by interaction between hydrogen sulfide and a cobalt salt soluble in said anhydride.

4. Process for the production of thiophane which comprises reacting succinic anhydride with hydrogen sulfide at a temperature in the range from about 180° C. to 325° C. in the presence of cobalt sulfide.

5. Process of claim 4 wherein said reacting is under a superatmospheric pressure and said cobalt sulfide is produced in situ in said reaction system.

6. Process for the production of 8-thiabicyclo-[4.3.0] nonane from an acid anhydride of the general formula

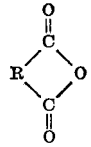

wherein R is a 6-membered alicyclic carbocyclic ring composed of carbon and hydrogen and having said carbonyl groups attached to said ring in the 1,2-relationship, which comprises reacting said anhydride with hydrogen sulfide at a temperature in the range from about 180° C. to about 325° C. in the presence of cobalt sulfide.

7. Process as in claim 6 wherein said reacting is effected at superatmospheric pressure in the added presence of hydrogen gas and wherein said cobalt sulfide is generated in situ by the interaction of hydrogen sulfide and a cobalt salt soluble in said anhydride.

8. Process for the production of an alkyl substituted 8-thiabicyclo-[4.3.0]nonane from a reducible anhydride of the formula:

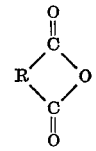

wherein R is a 6-membered alicyclic carbocyclic ring composed of carbon and hydrogen having said carbonyl groups attached to said ring in the 1,2-relationship; wherein at least one of said hydrogen atoms of said anhydride is replaced by an alkyl group; and wherein said anhydride contains less than 21 carbon atoms; which comprises reacting said anhydride with hydrogen sulfide at a temperature in the range from about 180° C. to about 325° C. in the presence of cobalt sulfide, thereby producing the corresponding substituted 8-thiabicyclo-[4.3.0]nonane.

9. Process for the production of cyclic sulfides from lactones of the general formula

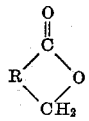

wherein R is a hydrocarbon radical having from 2 to about 18 carbon atoms and wherein said lactone functionality is present in a carbon-oxygen heterocyclic ring containing at least 4 but less than 6 carbon atoms, which comprises reacting said lactone with hydrogen sulfide at a temperature in the range from about 180° to 325° C. in the presence of cobalt sulfide.

10. Process for the production of cyclic sulfides from lactones of the general formula

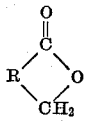

wherein R is a hydrocarbon radical having from 2 to about 18 carbon atoms and wherein said lactone functionality is present in a carbon-oxygen heterocyclic ring containing at least 4 but less than 6 carbon atoms, which comprises reacting under superatmospheric pressure said lactone with hydrogen sulfide at a temperature in the range from about 180° to 325° C. in the presence of cobalt sulfide and added hydrogen gas.

11. Process of claim 10 wherein said cobalt sulfide is produced in situ by interaction between hydrogen sulfide and a cobalt salt soluble in said lactone.

12. Process for the production of thiophane which comprises reacting γ-butyrolactone with hydrogen sulfide at a temperature in the range 180° C. to 325° C. in the presence of cobalt sulfide.

13. Process for the production of thiophane which comprises reacting under superatmospheric pressure γ-butyrolactone with hydrogen sulfide at a temperature in the range 180° C. to 325° C. in the presence of added hydrogen and cobalt sulfide, wherein said sulfide is produced in situ in said reaction system.

References Cited

Mayer et al., J. Prakt. Chem., 20(5–6), 245 (1963).

JOHN D. RANDOLPH, *Primary Examiner.*

WALTER A. MODANCE, *Examiner.*

C. SHURKO, *Assistant Examiner.*